(12) United States Patent
Schellens (10) Patent No.: US 10,718,848 B2
(45) Date of Patent: Jul. 21, 2020

(54) METHOD AND DEVICE FOR DIRECTION FINDING WITH DIRECTION EVALUATION

(71) Applicant: Rohde & Schwarz GmbH & Co. KG, Munich (DE)

(72) Inventor: Philipp Schellens, Ottobrunn (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 471 days.

(21) Appl. No.: 15/483,531

(22) Filed: Apr. 10, 2017

(65) Prior Publication Data

US 2018/0210061 A1    Jul. 26, 2018

(30) Foreign Application Priority Data

Jan. 20, 2017  (EP) .................................... 17152327
Mar. 6, 2017   (EP) .................................... 17159304

(51) Int. Cl.
| | | |
|---|---|---|
| G01S 5/02 | (2010.01) | |
| G01S 3/14 | (2006.01) | |
| G01S 3/78 | (2006.01) | |
| G01S 3/72 | (2006.01) | |
| G01S 3/00 | (2006.01) | |
| G01S 3/04 | (2006.01) | |
| G01S 3/46 | (2006.01) | |

(52) U.S. Cl.
CPC ..................... *G01S 3/14* (2013.01); *G01S 3/00* (2013.01); *G01S 3/72* (2013.01); *G01S 3/78* (2013.01); *G01S 3/046* (2013.01); *G01S 3/46* (2013.01)

(58) Field of Classification Search
CPC ... G01S 3/14; G01S 3/046; G01S 3/72; G01S 3/00; G01S 3/78; G01S 3/46; G01S 3/04

USPC .......................................... 342/417, 443, 445
See application file for complete search history.

(56) References Cited

U.S. PATENT DOCUMENTS

| | | | | |
|---|---|---|---|---|
| 3,820,026 A | * | 6/1974 | Messinger | G01R 29/0871 340/945 |
| 4,486,757 A | * | 12/1984 | Ghose | G01S 13/4454 342/417 |
| 5,334,984 A | * | 8/1994 | Akaba | G01S 3/10 342/148 |

(Continued)

FOREIGN PATENT DOCUMENTS

| | | |
|---|---|---|
| DE | 3622039 A1 | 1/1988 |
| DE | 102012101942 A1 | 9/2013 |

(Continued)

OTHER PUBLICATIONS

European Search Report for related European patent application 17159304.9-1812, dated Oct. 5, 2017, 8 pages.

*Primary Examiner* — Chuong P Nguyen
(74) *Attorney, Agent, or Firm* — Ditthavong & Steiner, P.C.

(57) ABSTRACT

A direction finding system is provided. It serves the purpose of finding a direction of an electromagnetic signal. The direction finding system comprises an antenna system for receiving the electromagnetic signal and a direction finder for determining the direction of the electromagnetic signal. The direction finder comprises a direction determiner, adapted to determine a number of possible directions, and a direction evaluator, adapted to evaluate the possible directions and determine the direction of the electromagnetic signal therefrom.

14 Claims, 6 Drawing Sheets

(56) References Cited

U.S. PATENT DOCUMENTS

| | | | | |
|---|---|---|---|---|
| 5,815,117 A * | 9/1998 | Kolanek | G01S 3/043 | 342/442 |
| 6,239,747 B1 * | 5/2001 | Kaminski | G01S 3/023 | 342/147 |
| 6,313,795 B1 * | 11/2001 | Herrmann | G01S 3/48 | 342/156 |
| 6,437,741 B1 * | 8/2002 | Fox | G01S 3/043 | 342/417 |
| 6,771,224 B2 * | 8/2004 | Apostolos | G01S 5/04 | 343/718 |
| 6,839,025 B1 * | 1/2005 | Reigle | G01S 3/14 | 342/417 |
| 6,914,559 B2 * | 7/2005 | Marks | G01S 3/48 | 342/428 |
| 7,408,509 B2 | 8/2008 | Karlsson et al. | | |
| 7,539,273 B2 * | 5/2009 | Struckman | G01S 3/74 | 342/373 |
| 8,410,981 B1 * | 4/2013 | Wernicke | G01S 3/46 | 342/420 |
| 8,451,936 B2 * | 5/2013 | McCorkle | G08B 13/2431 | 375/295 |
| 8,674,880 B2 * | 3/2014 | Lecca | G01S 3/023 | 342/441 |
| 8,952,843 B1 * | 2/2015 | West | H01Q 3/24 | 342/156 |
| 9,629,122 B2 * | 4/2017 | Yoon | H04W 72/02 | |
| 9,958,525 B2 * | 5/2018 | Bartko | G01S 3/043 | |
| 10,371,783 B2 * | 8/2019 | Wang | G01S 3/043 | |
| 2004/0164902 A1 * | 8/2004 | Karlsson | G01S 3/046 | 342/449 |
| 2010/0321242 A1 | 12/2010 | Robinson et al. | | |
| 2011/0133987 A1 * | 6/2011 | Bernsten | H04B 7/086 | 342/417 |
| 2011/0309981 A1 * | 12/2011 | Huizing | G01S 3/48 | 342/372 |
| 2013/0002489 A1 | 1/2013 | Erad et al. | | |
| 2013/0038739 A1 * | 2/2013 | Asjadi | H04B 7/088 | 348/180 |
| 2013/0050021 A1 | 2/2013 | Wang et al. | | |
| 2016/0018506 A1 * | 1/2016 | Bartko | G01S 3/043 | 342/443 |
| 2016/0269859 A1 | 9/2016 | Ekambaram et al. | | |
| 2018/0059206 A1 * | 3/2018 | Bartko | H04W 4/029 | |

FOREIGN PATENT DOCUMENTS

| | | | | |
|---|---|---|---|---|
| WO | 2014135196 A1 | 9/2014 | | |
| WO | WO-2014/135196 A1 * | 9/2014 | | G01S 3/04 |

* cited by examiner

METHOD AND DEVICE FOR DIRECTION FINDING WITH DIRECTION EVALUATION

PRIORITY

This application claims priority of European patent applications EP 17 152 327.7 filed on Jan. 20, 2017 and EP 17 159 304.9 filed on Mar. 6, 2017.

FIELD OF THE INVENTION

The invention relates to determining the direction of incoming electromagnetic signals. These electromagnetic signals can be radar signals or communications signals.

BACKGROUND OF THE INVENTION

In direction finding, it is of great importance to quickly determine an accurate direction of an incoming electromagnetic signal. In order to do so, a number of antennas are grouped to an antenna system and receive the electromagnetic signal. From the signals received by the different antennas of the antenna system, the direction can be determined. The higher the number of antennas used, the higher the accuracy of determining the direction of the electromagnetic signal usually is. On the other hand, with an increased number of antennas, the computational complexity and general hardware complexity rises significantly.

Especially in real-world environments, a number of problems can occur, which lead to direction finding errors. For example, the incoming electromagnetic signal can experience scattering or fading. This leads to a reception of multiple signals from slightly different directions. Also, depending upon the wave length of the incoming electromagnetic signal and the positioning of the antennas, direction ambiguities are possible.

For example, the international patent application WO 2014/135196 A1 shows such a direction finding system.

There is an object to improve the accuracy of direction finding while at the same time keeping the hardware effort and the computational complexity manageable.

SUMMARY OF THE INVENTION

According to a first aspect of the invention, a direction finding system is provided. It serves the purpose of finding a direction of an electromagnetic signal. The direction finding system comprises an antenna system for receiving the electromagnetic signal and a direction finder for determining the direction of the electromagnetic signal. The direction finder comprises a direction determiner, adapted to determine a plurality of possible directions, and a direction evaluator, adapted to evaluate the possible directions and determine the direction of the electromagnetic signal therefrom. Thereby, it is possible to use all information regarding possible directions within the signal received by the antenna system and determine the most likely actual direction of the electromagnetic signal therefrom. This leads to a high direction determining accuracy and at the same time requires only a low hardware complexity and computational complexity.

According to a first implementation form of the first aspect, the direction determiner comprises a direction database holding pre-stored data linking antennas system output signals to directions of electromagnetic signals, and a direction searcher, adapted to search for matches of present antenna system output signals resulting from the electromagnetic signal to the pre-stored antenna system output signals in the direction data base. Alternatively, the direction determiner is adapted to directly determine the plurality of possible directions using an approximation and/or characterization by a numerical function. Thereby, it is possible to very quickly determine the direction of the electromagnetic signal.

According to a further implementation form, the search is performed using a search function, advantageously a $\chi^2$ or a maximum likelihood function or a function based upon a noise-density. Thereby, an especially low computational complexity is achieved.

According to a further implementation form of the first aspect, the direction determiner comprises a minimum determiner, which is adapted to determine a number of local minima of the search function, corresponding to the number of possible directions. It is thereby possible to actually use all the available information within the received signals.

According to a further implementation form, the direction evaluator moreover comprises a minimum evaluator, which is adapted to evaluate the number of local minima, in order to evaluate the number of possible directions. Thereby, a quick and non-computationally complex determining of the best minimum is given.

According to a further implementation form, the minimum evaluator is adapted to determine which minimum of the number of local minima corresponds to the direction of the electromagnetic signal by statistically evaluating the number of local minima. Thereby, an especially accurate determining of the direction is possible.

According to a further implementation form, the direction evaluator comprises an occurrence counter, which is adapted to determine how often the minima of the number of local minima occur in consecutive measurements. The minimum evaluator is then adapted to determine the minimum corresponding to the direction of the electromagnetic signal based upon the number of occurrence of the minima. Alternatively or additionally, the direction evaluator comprises a threshold evaluator, adapted to compare the number of local minima to an absolute quality threshold and/or a minima distance threshold and/or a relative quality threshold. The minimum evaluator is then adapted to determine the minimum corresponding to the direction of the electromagnetic signal based upon the comparison of the number of local minima. It is thereby possible to accurately and quickly determine the minimum and thereby direction of the electromagnetic signal.

According to a further implementation form, the direction evaluator comprises a minimum number limiter, which is adapted to limit the number of local minima to be evaluated by the minimum evaluator to a pre-specified or adjustable value. It is thereby possible to further limit the computational complexity.

According to a further implementation form, the minimum evaluator is adapted to sort the number of local minima by ascending or descending quality, before evaluating them. This also reduces the computational complexity.

According to a second aspect of the invention, a direction finding method is provided. The method comprises receiving by an antenna system an electromagnetic signal, determining a number of possible directions, and evaluating the possible directions and determining the direction of the electromagnetic signal therefrom. Thereby, it is possible to use all information regarding possible directions within the signal received by the antenna system and determine the most likely actual direction of the electromagnetic signal therefrom. This leads to a high direction determining accuracy and at the same time requires only a low hardware complexity and computational complexity.

BRIEF DESCRIPTION OF THE DRAWINGS

Exemplary embodiments of the invention are now further explained with respect to the drawings, in which.

DETAILED DESCRIPTION OF PREFERRED EMBODIMENTS

First we demonstrate the construction and function of different embodiments of the direction finding system of the first aspect of the invention along FIG. 1-FIG. 6. Along FIG. 7, the function of an embodiment of the second aspect of the invention is described. Similar entities and reference numbers in different figures have been partially omitted.

Figure 1:
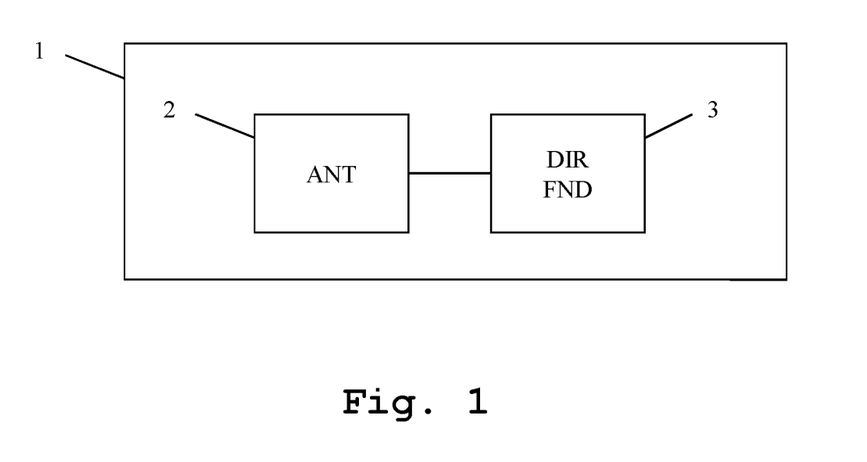
FIG. 1 shows a first embodiment of the direction finding system of the first aspect of the invention in a block diagram.

In FIG. 1, a first embodiment of the direction finding system 1 according to the first aspect of the invention is shown. The direction finding system 1 comprises an antenna system 2, consisting of a number of antennas and a direction finder 3.

The antenna system 2 is connected to the direction finder 3. The antenna system 2 receives the incoming electromagnetic signal. Especially, each individual antenna of the antenna system 2 receives a slightly different version of the electromagnetic signal. These signals are handed on to the direction finder 3, which determines the direction of the electromagnetic signal therefrom. Along FIG. 2-FIG. 5, further details of this direction finding are shown.

Figure 2:
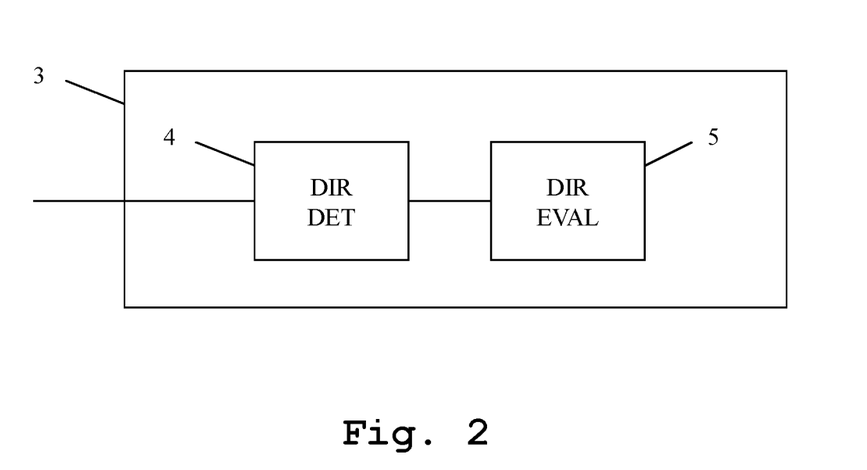
FIG. 2 shows a detailed view of a second embodiment of the direction finding system according to the first aspect of the invention in a block diagram.

In FIG. 2, a second embodiment of the direction finding system of the first aspect of the invention is shown. Here, the inner construction of the direction finder 3 is shown. The direction finder 3 comprises a direction determiner 4 connected to a direction evaluator 5. The signals provided by the antenna system 2 are handed to the direction determiner 4, which determines a number of possible directions therefrom. This is further explained along FIG. 3. The number of possible directions are then handed on to the direction evaluator 5, which evaluates the number of directions and determines the direction of the electromagnetic signal therefrom. This is further explained along FIG. 4 and FIG. 5.

The direction finder 3 may additionally comprise a display, which is not depicted here. On this display, results of the direction finding are displayed.

Figure 3:
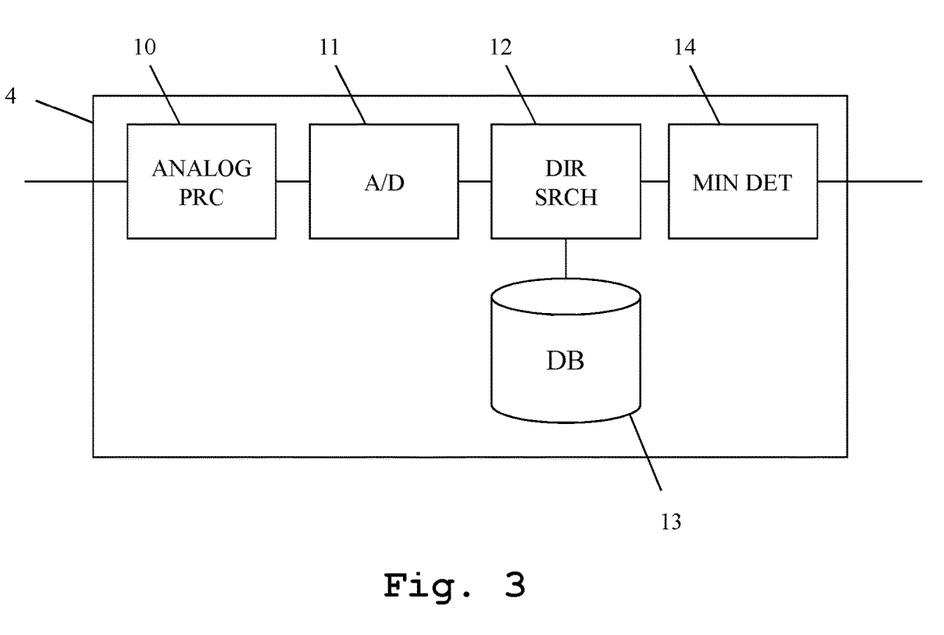
FIG. 3 shows a detailed view of a third embodiment of the direction finding system according to the first aspect of the invention in a block diagram.

In FIG. 3, a third embodiment of the direction finding system of the first aspect of the invention is shown. Here, the construction of the direction determiner 4, as shown in FIG. 2, is depicted. The direction determiner 4 comprises analog processing means 10 connected to an analog-digital-converter 11, connected to a direction searcher 12, which in turn is connected to a direction data base 13 and to a minimum determiner 14.

The signals provided by the antennas of the antenna system 2 are provided to the analog processing means 10. An analog processing is performed there. The analog processing can for example comprise a filtering and/or a mixing. Also other analog processing steps are possible, here. The resulting signals are handed on to the analog-digital-converter 11, which digitizes the signals. The digitized signals then are provided to the direction searcher 12, which performs a direction search.

Within the direction data base 13, pre-stored data linking antenna output signals to directions of electromagnetic signals are stored. These are made available to the direction searcher 12. Therefore, the direction searcher 12 searches for the direction of the electromagnetic signal by comparing the digitized signals provided by the analog digital converter 11 to the signals and directions stored in the direction data base 13. This comparison is done using a search function. A search function can for example be a $\chi^2$ function or a maximum likelihood function or can be based upon a noise-density. Also other search functions can be used.

Alternatively to the direction searcher 12 and the direction database 13 of FIG. 3, also a direct determining of the possible directions based on an approximation and/or characterization by a numerical function is possible. In this case, the direction determiner 4 comprises a direction characterizer for doing so, instead of the direction searcher 12 and the direction database 13. The direction characterizer then generates the possible directions directly from the digital values provided by the analog-digital-converter 11 based on an approximation and/or characterization by a numerical function and hands them to the minimum determiner 14. When speaking of the direction of the electromagnetic signal, a direction in azimuth and elevation is meant preferably. Separate cost functions can be determined for these two dimensions. Alternatively, a single cost function and compassing both dimensions can be used.

Minima of the search function correspond to possible directions of the electromagnetic signal. It is important to note that not necessarily the strongest minimum needs to correspond to the actual direction of the electromagnetic signal. For reasons of the above-explained errors, it is easily possible that a local minimum in the search function represents the actual direction of the electromagnetic signal. Therefore, not only the strongest minimum is determined, but a number of local minima is determined. This is done by the minimum determiner 14. These minima can be determined by sequentially going through the values of the search function. Also, it is possible to determine local minima based upon the steepness of the search function. The determined number of local minima is handed on to the direction evaluator 5.

Figure 4:
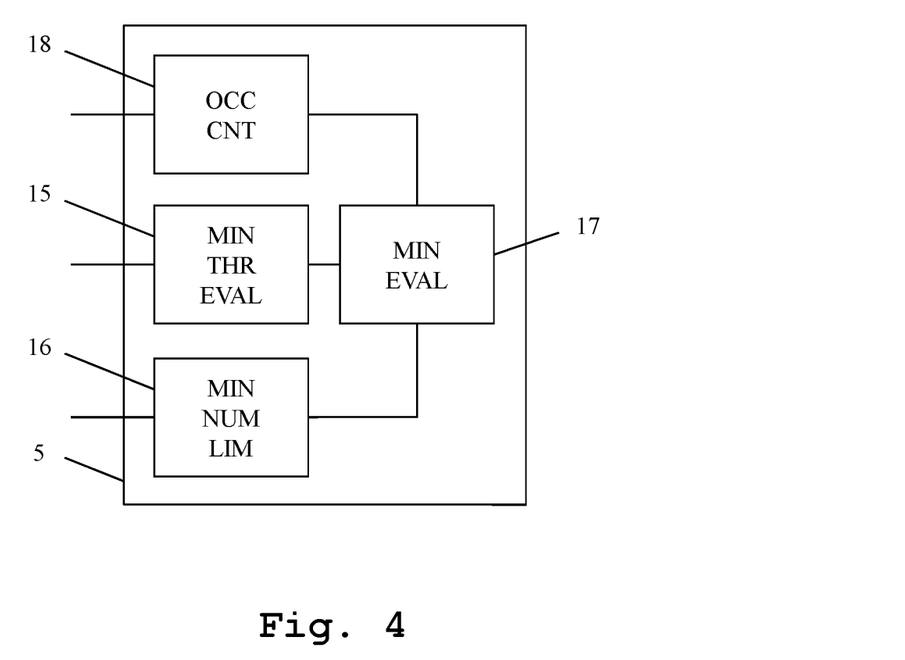
FIG. 4 shows a detailed view of a fourth embodiment of the direction finding system according to the first aspect of the invention in a block diagram.

In FIG. 4, a further embodiment of the direction finding system of the first aspect of the invention is depicted. Here, the inner construction of the direction evaluator 5 is shown. The direction evaluator 5 comprises an occurrence counter 18, a minimum threshold evaluator 15 and a minimum number limiter 16, each connected to a minimum evaluator 17. The direction evaluator 5 though does not have to comprise the occurrence counter 18, the minimum threshold evaluator 15 and the minimum number limiter 16. Only one or some of these components may be used.

The occurrence counter 18, the minimum threshold evaluator 15 and the minimum number limiter 16 are each provided with the number of local minima determined by the direction determiner.

The occurrence counter 18 determines how often in successive measurements, for example consecutive radar pulses, the respective minima occur at the same direction. Only minima occurring in a certain number of consecutive measurements are considered as valid minima. This information is handed on to the minimum evaluator 17.

The minimum threshold evaluator 15 moreover evaluates the number of local minima regarding one or more different thresholds. For example, an absolute value threshold can be considered. This means that each of the number of local minima is compared to the absolute value threshold. Only minima which are lower than the absolute value threshold are considered as valid minima. Also, a comparison to a minima distance threshold is possible. This means that only minima, which are apart by a certain direction angle are considered as valid minima. In case of two minima lying too close together in their direction, only the otherwise more probable minimum is further processed. In addition, a relative quality threshold can be used. This means that only minima, which are lower than their immediate surroundings by the relative quality threshold, are considered as valid minima.

Moreover, the minimum number limiter 16 can set a number of minima of the number of local minima to be further evaluated. This can further limit the computational complexity, since only a limited number of minima is processed. This value can either be user-adjusted or pre-specified. Also, an automatic adaption according to available computational resources and other factors is possible.

The information provided by the occurrence counter 18, the minimum threshold evaluator 15 and the minimum number limiter 16 are provided to the minimum evaluator 17. The minimum evaluator 17 uses the available information in order to evaluate the number of local minima and to determine the actual direction of the electromagnetic signal.

Figure 5:
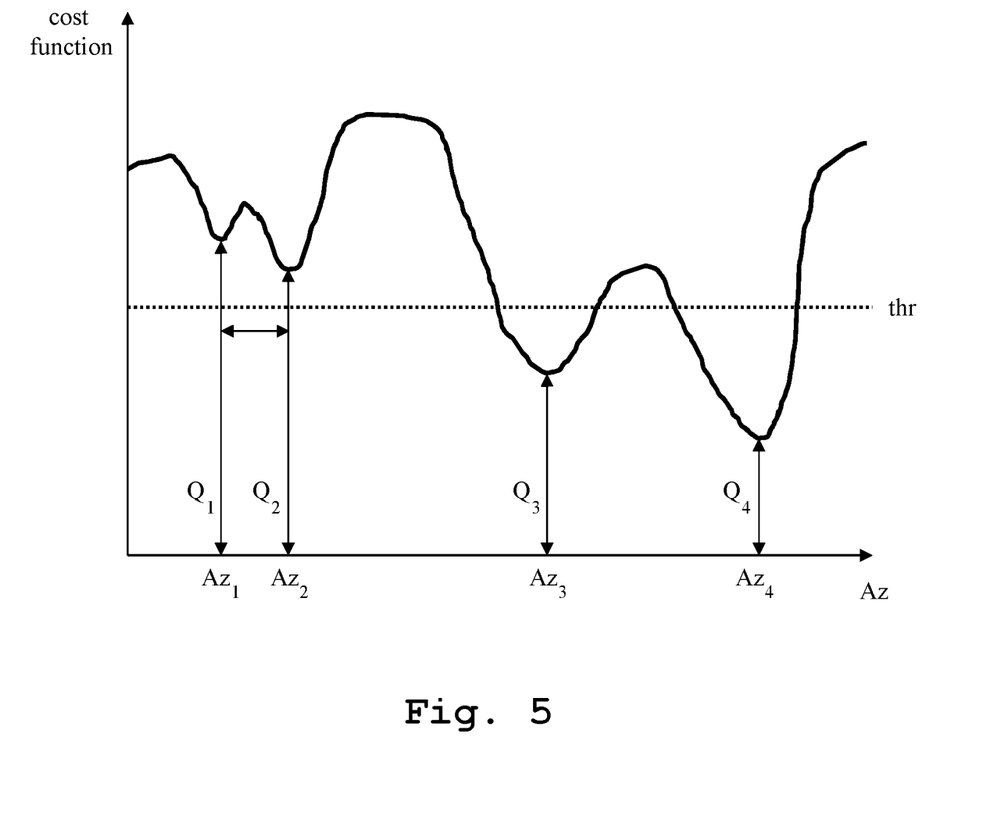
FIG. 5 shows a two-dimensional cost function as used by a fifth embodiment of the direction finding system of the first aspect of the invention.

In FIG. 5, a cost function is shown over an azimuth angle.

The cost function shown in FIG. 5 comprises a number of minima $Q_1$, $Q_2$, $Q_3$, $Q_4$ occurring at different directions $Az_1$, $Az_2$, $Az_3$, $Az_4$. It is evident that only one of the number of local minima $Az_1$-$Az_4$ is the global minimum $Az_4$. As explained earlier, this minimum though does not have to correspond to the direction of the electromagnetic signal. Here, additionally, an absolute quality threshold thr is depicted. If this threshold thr is used, only minima, which are lower than the threshold thr are considered as valid minima. In this case, only the minima $Q_3$ and $Q_4$ would be considered as valid. Alternatively or additionally, the other above-explained criteria for evaluating the minima can be used. For example, the minimum $Q_1$ may be disregarded, since it is too close to the minimum $Q_2$, while the minimum $Q_2$ has a lower value and therefore higher quality.

Figure 6:
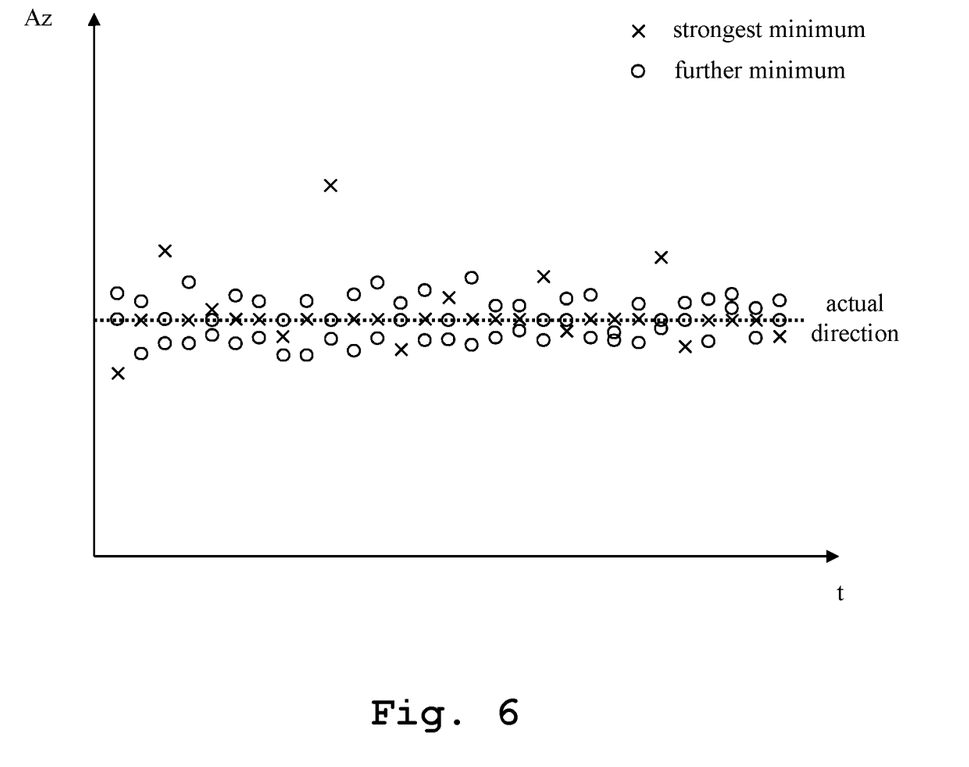
FIG. 6 shows a number of minima of the cost function as used by a sixth embodiment of the direction finding system of the first aspect of the invention, over time.

In FIG. 6, a number of local minima of the cost function are shown over time. Here, the three strongest minima of the cost function for each instance of time are shown. The strongest minimum—the absolute minimum is depicted using an x, while the next best—lowest—minima are depicted using an ○. It is apparent that the best minimum does not always match the actual direction of the electromagnetic signal. Over time though it is obvious that the actual direction counts significantly more "hits" that any other direction. This is exploited for example by the occurrence counter 18 of FIG. 4.

Figure 7:
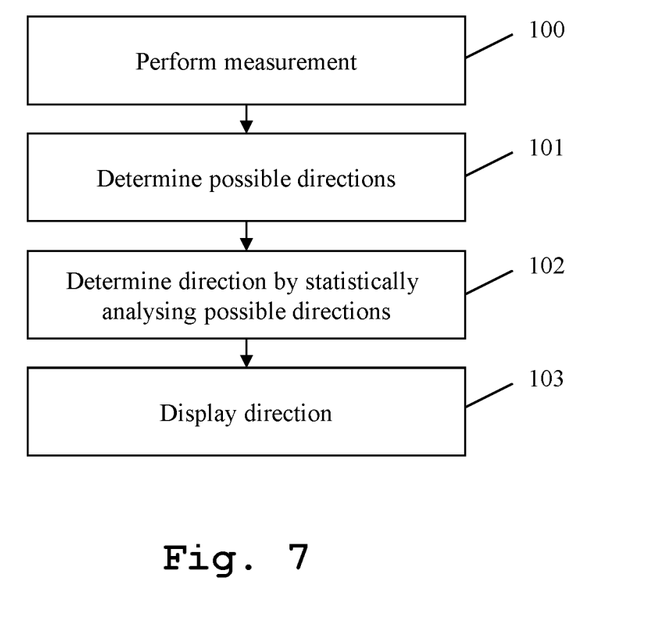
FIG. 7 shows an embodiment of the second aspect of the invention in a flow diagram.

Finally, along FIG. 7, an embodiment of the second aspect of the invention is shown. In a first step 100, a measurement of the electromagnetic signal by a number of antennas of an antenna system is performed. In a second step 101, from the received signals, a number of possible directions is determined. In a third step 102, the actual direction of the electromagnetic signal is determined by statistically analyzing the possible directions. In a final step 103, the direction is displayed on a display.

In the following, the underlying mathematics are described in detail. For performing the direction finding of the electromagnetic signal, the electromagnetic signal is sampled by several antennas forming an antenna-group as described earlier, for example the three antennas.

During production of the inventive measuring device, each antenna-group is subjected to an initial measurement, with defined electromagnetic signals of defined direction in azimuth and elevation and defined frequency and polarization.

$$V_{ref,k}(\alpha,\varepsilon,f,\pi) = A_{ref,k}(\alpha,\varepsilon,f,\pi)\exp(j\phi_{ref,k}(\alpha,\varepsilon,f,\pi))$$

is defined as the resulting measured antenna voltage of the individual antennas k=1 . . . N for an electromagnetic signal of azimuth $\alpha$, elevation $\varepsilon$, frequency f and polarization $\pi$. The following amplitude quotients and phase differences between the elements k and l arise:

$$r_{ref,kl}(\alpha,\varepsilon,f,\pi) = \frac{A_{ref,k}(\alpha,\varepsilon,f,\pi)}{A_{ref,l}(\alpha,\varepsilon,f,\pi)}$$

$$\Delta\phi_{ref,kl}(\alpha,\varepsilon,f,\pi) = \phi_{ref,k}(\alpha,\varepsilon,f,\pi) - \phi_{ref,l}(\alpha,\varepsilon,f,\pi)$$

From M repetitions of the above described reference measurement the measurement error can now be determined:

$$\sigma^2(r_{ref,kl}(\alpha,\varepsilon,f,\pi)) = \frac{1}{M}\sum_{i=1}^{M}[r_{ref,kl,i}(\alpha,\varepsilon,f,\pi)]^2 - \left[\frac{1}{M}\sum_{i=1}^{M}r_{ref,kl,i}(\alpha,\varepsilon,f,\pi)\right]^2$$

$$\sigma^2(\Delta\phi_{ref,kl}(\alpha,\varepsilon,f,\pi)) = \frac{1}{M}\sum_{i=1}^{M}[\Delta\phi_{ref,kl,i}(\alpha,\varepsilon,f,\pi)]^2 - \left[\frac{1}{M}\sum_{i=1}^{M}\Delta\phi_{ref,kl,i}(\alpha,\varepsilon,f,\pi)\right]^2$$

This measurement error though should not be confused with the above described direction uncertainty angle.

After these initial reference measurements are performed, the measuring device is shipped to a user. When an actual direction finding of a signal is performed, $$V_{mess,k,i} = A_{mess,k,i}\exp(j\phi_{mess,k,i})$$

defined as the measured antenna voltage of the individual antenna k=1 . . . N for an electromagnetic signal of frequency f, unknown polarization and unknown direction. The electromagnetic signal is sampled consecutively i=1 . . . M times. The following amplitude quotients and phase differences arise:

$$r_{mess,kl,i} = \frac{A_{mess,k,i}}{A_{mess,l,i}}$$

$$\Delta\phi_{mess,kl,i} = \phi_{mess,k,i} - \phi_{mess,l,i}$$

From the M signal samples, the measurement error can now be determined:

$$\sigma^2(r_{mess,kl}) = \frac{1}{M}\sum_{i=1}^{M}[r_{mess,kl,i}]^2 - \left[\frac{1}{M}\sum_{i=1}^{M} r_{mess,kl,i}\right]^2$$

$$\sigma^2(\Delta\phi_{mess,kl}) = \frac{1}{M}\sum_{i=1}^{M}[\Delta\phi_{mess,kl,i}]^2 - \left[\frac{1}{M}\sum_{i=1}^{M} \Delta\phi_{mess,kl,i}\right]^2$$

As explained above, this measurement error is not to be confused with the direction uncertainty angle. Although it can be additionally displayed. For example it can be displayed as a probability of correctness of each detected direction.

From the values calculated before, a search function is now calculated. In this example a $\chi^2$ function is used. Alternatively, a maximum likelihood function or a function based upon a noise-density can also be used.

$$\chi^2(\alpha,\varepsilon,\pi) = \sum_{\substack{k,l \\ k<l}} \frac{[r_{ref,kl}(\alpha,\varepsilon,f,\pi) - r_{mess,kl}]^2}{\sigma^2(r_{ref,kl}(\alpha,\varepsilon,f,\pi)) + \sigma^2(r_{mess,kl})} +$$

$$\sum_{\substack{k,l \\ k<l}} \frac{[\Delta\phi_{ref,kl}(\alpha,\varepsilon,f,\pi) - \Delta\phi_{mess,kl}]^2}{\sigma^2(\Delta\phi_{ref,kl}(\alpha,\varepsilon,f,\pi)) + \sigma^2(\Delta\phi_{mess,kl})}$$

The values $(\alpha_0,\varepsilon_0,\pi_0)$ are now determined, such that $\chi^2(\alpha_0,\varepsilon_0,\pi_0)$ is minimal. A direction finding quality can be calculated as:

$$p = 1 - P\left(\frac{2}{2}, \frac{\chi^2(\alpha_0,\varepsilon_0,\pi_0)}{2}\right)$$

wherein $$P\left(\frac{n}{2}, \frac{x}{2}\right)$$

describes a regularized incomplete gamma function.

The 1σ-Confidence intervals $\Delta\alpha$ and $\Delta\varepsilon$ are determined by numerically solving the following formulas:

$$\chi^2(\alpha_0+\Delta\alpha,\varepsilon_0,\pi_0) = \chi^2(\alpha_0,\varepsilon_0,\pi_0) \pm 1$$

$$\chi^2(\alpha_0,\varepsilon_0+\Delta\varepsilon,\pi_0) = \chi^2(\alpha_0,\varepsilon_0,\pi_0) + 1$$

1σ-Confidence intervals $\Delta\alpha$ and $\Delta\varepsilon$ correspond to the direction uncertainty angles.

The invention is not limited to the examples and especially not to a certain number of antennas in the antenna system. Also different cost functions can be used. The characteristics of the exemplary embodiments can be used in any advantageous combination.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above-described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed:

1. A direction finding system for direction finding of an electromagnetic signal, comprising:
    an antenna system for receiving the electromagnetic signal, and a direction finder, for determining an actual direction of the electromagnetic signal from which the electromagnetic signal originated,
    wherein the direction finder comprises:
        a direction determiner, configured to determine a plurality of directions from which the electromagnetic signal could have originated, and
        a direction evaluator, configured to evaluate the plurality of directions and to determine the actual direction of the electromagnetic signal therefrom,
    wherein the direction evaluator comprises a minimum evaluator, configured to evaluate the number of local minima, in order to evaluate the number of directions, and
    wherein the direction evaluator comprises a threshold evaluator, configured to compare the number of local minima to an absolute quality threshold and/or a minima distance threshold and/or a relative quality threshold.

2. The direction finding system according to claim 1, wherein the direction determiner comprises:
    a direction database holding pre-stored data linking antenna system output signals to directions of electromagnetic signals, and
    a direction searcher, configured to search for matches of present antenna system output signals resulting from the electromagnetic signal to the pre-stored antenna system output signals in the direction database, or
    wherein the direction determiner is configured to directly determine the plurality of directions using an approximation and/or characterization by a numerical function.

3. The direction finding system according to claim 2, wherein the direction searcher is configured to perform the search using a search function, advantageously a $\chi^2$ function or a maximum likelihood function or a function based upon a noise-density.

4. The direction finding system according to claim 3, wherein the direction determiner comprises a minimum determiner, configured to determine a number of local minima of the search function, corresponding to the number of the plurality of directions.

5. The direction finding system according to claim 4, wherein the minimum evaluator is configured to determine which minimum of the number of local minima corresponds to the direction of the electromagnetic signal by statistically evaluating the number of local minima.

6. The direction finding system according to claim 4, wherein the direction evaluator comprises an occurrence counter, configured to determine how often the minima of the number of local minima occur in consecutive measurements, and
wherein the minimum evaluator is configured to determine the minimum corresponding to the direction of the electromagnetic signal based upon the number of occurrence of the minima.

7. The direction finding system according to claim 4, wherein the minimum evaluator is configured to determine the minimum corresponding to the direction of the electromagnetic signal based upon the comparison of the number of local minima.

8. The direction finding system according to claim 4, wherein the direction evaluator comprises a minimum number limiter, configured to limit the number of local minima to be evaluated by the minimum evaluator to a pre-specified or adjustable value.

9. The direction finding system according to claim 4, wherein the minimum evaluator is configured to sort the number of local minima by ascending or descending quality, before evaluating them.

10. A direction finding method for direction finding of an electromagnetic signal by a direction finding system, comprising:
   receiving the electromagnetic signal by an antenna system,
   determining a plurality of directions from which the electromagnetic signal could have originated by a direction determiner,
   evaluating the directions by a direction evaluator and determine an actual direction of the electromagnetic signal from which the electromagnetic signal originated,
   evaluating the number of local minima by a minimum evaluator of the direction evaluator, in order to evaluate the number of directions, and
   comparing the number of local minima to an absolute quality threshold and/or a minima distance threshold and/or a relative quality threshold by a threshold evaluator of the direction evaluator.

11. The direction finding method according to claim 10, wherein the determining of the directions comprises:
   holding pre-stored data linking antenna system output signals to directions of electromagnetic signals in direction database by a direction database, and
   searching for matches of present antenna system output signals resulting from the electromagnetic signal to the pre-stored antenna system output signals held in the direction database by a direction searcher, or
   wherein determining of the directions is performed directly, using an approximation and/or characterization by a numerical function by the direction determiner.

12. The direction finding method according to claim 11, wherein the searching for matches comprises using a search function, advantageously a $\chi^2$ function or a maximum likelihood function or a function based upon a noise-density by the direction searcher.

13. A computer with program code means for performing the following steps if the program is executed on a computer or a digital signal processor:
   receiving the electromagnetic signal by an antenna system,
   determining a plurality of directions from which the electromagnetic signal could have originated by a direction evaluator,
   evaluating the directions by a direction evaluator and determine an actual direction of the electromagnetic signal from which the electromagnetic signal originated,
   evaluating the number of local minima by a minimum evaluator of the direction evaluator in order to evaluate the number of directions, and
   comparing the number of local minima to an absolute quality threshold and/or a minima distance threshold and/or a relative quality threshold by a threshold evaluator of the direction evaluator.

14. A non-transitory computer readable medium with stored program code means for performing the following steps if the program is executed on a computer or a digital signal processor:
   receiving the electromagnetic signal by an antenna system,
   determining a plurality of directions from which the electromagnetic signal could have originated by a direction evaluator,
   evaluating the directions by a direction evaluator and determine an actual direction of the electromagnetic signal from which the electromagnetic signal originated,
   evaluating the number of local minima by a minimum evaluator of the direction evaluator in order to evaluate the number of directions, and
   comparing the number of local minima to an absolute quality threshold and/or a minima distance threshold and/or a relative quality threshold by a threshold evaluator of the direction evaluator.

* * * * *